(12) United States Patent
Kim et al.

(10) Patent No.: US 12,456,454 B2
(45) Date of Patent: Oct. 28, 2025

(54) SYSTEM AND METHOD FOR A PERSONALIZED DIALOGUE SYSTEM USING KNOWLEDGE-BASED ENTITY SERVICES

(71) Applicant: Robert Bosch GmbH, Stuttgart (DE)

(72) Inventors: Hyeongsik Kim, San Jose, CA (US); Amir Hossein Yazdavar, Manhattan, KS (US)

(73) Assignee: Robert Bosch GmbH (DE)

( * ) Notice: Subject to any disclaimer, the term of this patent is extended or adjusted under 35 U.S.C. 154(b) by 258 days.

(21) Appl. No.: 17/242,411

(22) Filed: Apr. 28, 2021

(65) Prior Publication Data

US 2022/0351716 A1  Nov. 3, 2022

(51) Int. Cl.
| | |
|---|---|
| *G06F 17/00* | (2019.01) |
| *G06N 3/08* | (2023.01) |
| *G06N 5/02* | (2023.01) |
| *G10L 15/02* | (2006.01) |
| *G10L 25/30* | (2013.01) |

(52) U.S. Cl.
CPC ........... *G10L 15/02* (2013.01); *G06N 3/08* (2013.01); *G06N 5/02* (2013.01); *G10L 25/30* (2013.01)

(58) Field of Classification Search
CPC . G10L 15/02; G06N 3/08; G06N 5/02; G06N 25/30
USPC ........................................................ 704/200
See application file for complete search history.

(56) References Cited

U.S. PATENT DOCUMENTS

| | | | |
|---|---|---|---|
| 9,275,427 | B1 | 3/2016 | Sharifi |
| 9,678,976 | B2 | 6/2017 | Lambright |
| 9,836,452 | B2 | 12/2017 | Robichaud et al. |
| 9,998,472 | B2 | 6/2018 | VerWeyst et al. |
| 10,534,862 | B2 | 1/2020 | Canim et al. |
| 10,678,835 | B2 | 6/2020 | Saha et al. |
| 11,455,987 | B1* | 9/2022 | Dabas ............... G06F 3/167 |
| 2017/0357720 | A1* | 12/2017 | Torabi ............ G06F 16/7844 |
| 2020/0050667 | A1* | 2/2020 | Lin ................... G06F 16/35 |
| 2020/0202194 | A1* | 6/2020 | Wu ................... G06F 40/35 |
| 2021/0012406 | A1* | 1/2021 | Wadhwa .......... G06Q 30/0255 |
| 2021/0342541 | A1* | 11/2021 | Taylor ............ G06F 16/3328 |
| 2021/0350225 | A1* | 11/2021 | Dang ................. G06N 3/088 |

(Continued)

OTHER PUBLICATIONS

Yazdavar, Amir Hossein, et al. "Multimodal mental health analysis in social media." Plos one 15.4 (2020): e0226248, 27 pages.

(Continued)

*Primary Examiner* — Paul C McCord
(74) *Attorney, Agent, or Firm* — Dickinson Wright PLLC

(57) ABSTRACT

A speech recognition system includes a microphone configured to receive a speech input from one or more users and a processor in communication with the microphone. The processor is programmed to parse a plurality of candidate speech recognition results from a speech input from a user, extract one or more entities from the plurality of candidate speech recognition results, based on natural language understanding (NLU) information, select and retrieve data indicative of information of the one or more entities from a remote server, update a personal knowledge graph associated with a user profile of the user utilizing the data indicative of information of the one or more entities, and output a response to the speech input utilizing the user profile.

20 Claims, 10 Drawing Sheets

(56) References Cited

U.S. PATENT DOCUMENTS

2021/0353218 A1* 11/2021 Edwards .............. A61B 5/4088
2022/0019410 A1*  1/2022 Cangea ..................... G06F 8/33
2022/0207067 A1*  6/2022 Lee ......................... G06F 40/20
2023/0289955 A1*  9/2023 Xie ....................... G06T 7/0012

OTHER PUBLICATIONS

Sap, Maarten, et al. "Developing age and gender predictive lexica over social media." Proceedings of the 2014 Conference on Empirical Methods in Natural Language Processing (EMNLP). 2014, 6 pages.

Durmaz, O., & Bilge, H. S. (2019). Fast image similarity search by distributed locality sensitive hashing. Pattern Recognition Letters, 128, 9 pages.

Hu, H., Dobbie, G., Salcic, Z., Liu, M., Zhang, J., & Zhang, X. (2020, May). A Locality Sensitive Hashing Based Approach for Federated Recommender System. In 2020 20th IEEE/ACM International Symposium on Cluster, Cloud and Internet Computing (CCGRID) (pp. 836-842). IEEE, 7 pages.

Ji, J., Li, J., Yan, S., Tian, Q., & Zhang, B. (Dec. 2013). Min-max hash for jaccard similarity. In 2013 IEEE 13th International Conference on Data Mining (pp. 301-309). IEEE, 9 pages.

D Bahdanau, K Cho, Y Bengio, Neural machine translation by jointly learning to align and translate. In International Conference on Learning Representations 2015, 15 pages.

* cited by examiner

SYSTEM AND METHOD FOR A PERSONALIZED DIALOGUE SYSTEM USING KNOWLEDGE-BASED ENTITY SERVICES

TECHNICAL FIELD

The present disclosure relates to dialogue systems, such as a chat bot or voice recognition system, that may utilize a natural language understanding engine.

BACKGROUND

Conversational agents have experienced a substantial gain thanks to the emergence of smartphones, wearables and Internet of things (IoT), and now they are even more ubiquitous within enterprises for enhancing customer experiences. As such, they provide varying degrees of intelligence from a basic front-end solution for answering standard FAQs to sophisticated models that can truly augment customer experience based on the use of natural language understanding (NLUs) using deep neural networks. Employing existing KGs for building intelligent conversational agents that give out a concise result while understanding a natural language question and map it to the structured queries over KGs has drawn a lot of interest.

The interactions between conversational agent and customer poses several natural language challenges. For instance, most words in natural language are polysemous (used in more than one way) and we often retrieve their core meaning by the contextual information. The ambiguity problem where an entity can be associated with several other entities in KGs or composition problem where improper entity or relation in the KG lead to wrong response are common challenges. In particular, for understanding the complex natural language, it is necessary to have a robust function that recognizes named entities (NER) and their linkage. NER aims to identify entities while categorizing them into a referent entity in KG. Entity disambiguation (ED) on the other hand, tries to resolve references to entities in KG.

Modeling user's daily basis interaction inspires researchers to represent their surroundings with structured information about entities, their attributes, and relationships that are personally related to them. The notion of knowledge model or schema still exists but with one major difference that every entity has a connection to a user. As opposed to the well-established relations in general-purpose KGs, relations here are often short-lived. Probably one of the main challenges is how to automatically populate them. Learning user-oriented facts from the dialogues between the user and conversational agent would be a plausible approach if the inherent problem of the colloquial nature of dialogues e.g., topic drift, short and noisy content, and dealing with lots of pronouns tackled properly.

SUMMARY

According to one embodiment, a method is executed by a controller for speech recognition in a system. The method includes parsing a plurality of candidate speech recognition results from a speech input from a user, receiving a first plurality of feature vectors from each of the plurality of candidate speech recognition results from a speech recognition engine, the first plurality of feature vectors includes a first confidence score, receiving a second plurality of feature vectors from each of the plurality of candidate speech recognition results from the speech recognition engine, the second plurality of feature vectors includes a second confidence score that is lower than the first confidence score, extracting, based on natural language understanding (NLU) information, a NLU result from each of the plurality of candidate speech recognition results, associating, via a ranker, a ranking score to each of the plurality of candidate speech recognition results, the ranking score being based on the plurality of feature vectors and the NLU result of each of the plurality of candidate speech recognition results, wherein the neural network ranker promotes the second confidence score to be greater than the first confidence score based on the NLU related features, selecting a user profile associated with the user, wherein the user profile includes a personalized knowledge graph, updating and outputting the user profile utilizing the plurality of candidate speech recognition results and the personalized knowledge graph, and outputting a response to the speech input utilizing at least the user profile.

According to one embodiment, a method executed by a controller for speech recognition in a system is disclosed. The method includes parsing a plurality of candidate speech recognition results from a speech input from a user, extracting one or more entities from the plurality of candidate speech recognition results, based on natural language understanding (NLU) information, selecting and retrieving data indicative of information of the one or more entities from a remote server, updating a personal knowledge graph associated with a user profile of the user utilizing the data indicative of information of the one or more entities, and outputting a response to the speech input utilizing the user profile and the NLU information.

According to one embodiment, a speech recognition system includes a microphone configured to receive a speech input from one or more users and a processor in communication with the microphone. The processor is programmed to parse a plurality of candidate speech recognition results from a speech input from a user, extract one or more entities from the plurality of candidate speech recognition results, based on natural language understanding (NLU) information, select and retrieve data indicative of information of the one or more entities from a remote server, update a personal knowledge graph associated with a user profile of the user utilizing the data indicative of information of the one or more entities, and output a response to the speech input utilizing the user profile.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure herein introduces a novel entity service framework which can be embedded into intelligent conversational platforms. The goal of this framework is to assist users by providing customized information and knowledge to enhance the alignment of their behaviors and general recommendations. The service based on this framework also can provide with information that may not be "prominent enough" to be contained in publicly available Knowledge Graphs (KGs) such as Wikidata and DBpedia. Building a personal source of factual knowledge that not only connects the entities and their relations but also customized for each user. This will assist the conversation understanding procedure and enhancing customer experiences. For instance, the conversational agent linked with the service could deal with cases where a lactose intolerance user who seeks a substitute for milk in chocolate pudding, or a diabetic who is searching to increase the fiber content of his meal. The service framework consists of three components that (i) curates the collection of relevant background information from different domains and building a dedicated knowledge graph (KG) that integrate these heterogeneous data sources and facilitate data interpretation, (ii) understands conversations from users by associating texts to appropriate canonical entities in KGs (iii) generates user-profiles and behavioral logs while optimizing the linking process that maximizes the coherency between candidate entities and unambiguous entities with statistical neural network models.

Figure 1:
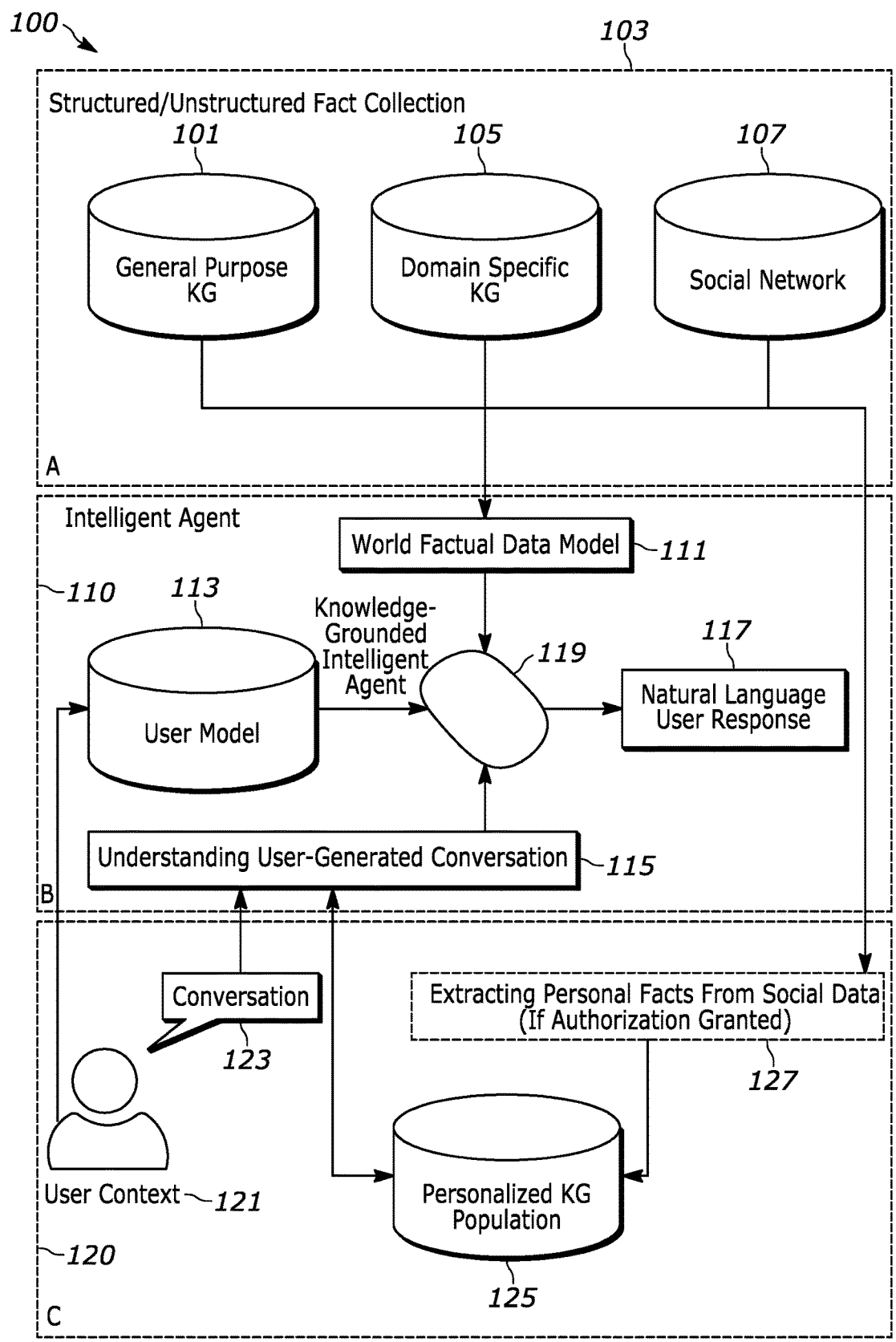
FIG. 1 discloses an embodiment of a dialogue intelligent system and agent according to one illustrative embodiment.

FIG. 1 shows an overall architecture of a personalized dialogue intelligent system and agent which mainly consists of three building blocks: i) a block that includes a curated collection of relevant background information from domain-specific knowledge graphs (KGs) 105, social network KGs 107, and general purpose KGs 101; ii) a block that represents an intelligent agent collecting data from users and constructing user models 113; iii) a block that understands user-generated conversations while performing entity extraction and disambiguation, and populating contextual and personalized user-based KGs 125.

The first block of the system 100 may include a structure and instructed fact collection portion 103. The structured/unstructured portion 103 may include the general purpose KG 101, the domain specific KG 105, and social network capabilities 107. The social network may include access to various social network database and information, such as a user's Twitter page, Facebook, Instagram, LinkedIN, etc. Such information may be fed to a world factual model in the second block 111. The knowledge-grounded intelligent agent 119 may interact with the word factual data model 111, the natural language user response module 117, the user model that models the profiles of the users 113, and be utilized for the understanding of user-generated conversation 115, constructed from the conversation in the third block. Finally, the system 100 may need the third block that includes a contextual entity detection and disambiguation service framework which models entities in conversation with their surrounding context while gradually optimizing and customizing the results by collecting further personal data from users. The user may have user context 121 that has a conversation 123 spoken. The conversation 123 may be sent to the understanding user-generated conversation 115. The data collection process described in the third block allows the system to collect the history of user behaviors while interacting with the system. All possible contextual data (e.g., geolocation information), as well as the information users, may be provided in the dedicated section of the system to set up and store his/her profile (e.g., user preference). This information will further get exploited as part of the context by the intelligent agent while generating a response as shown by the intelligent agent 110.

Figure 2:
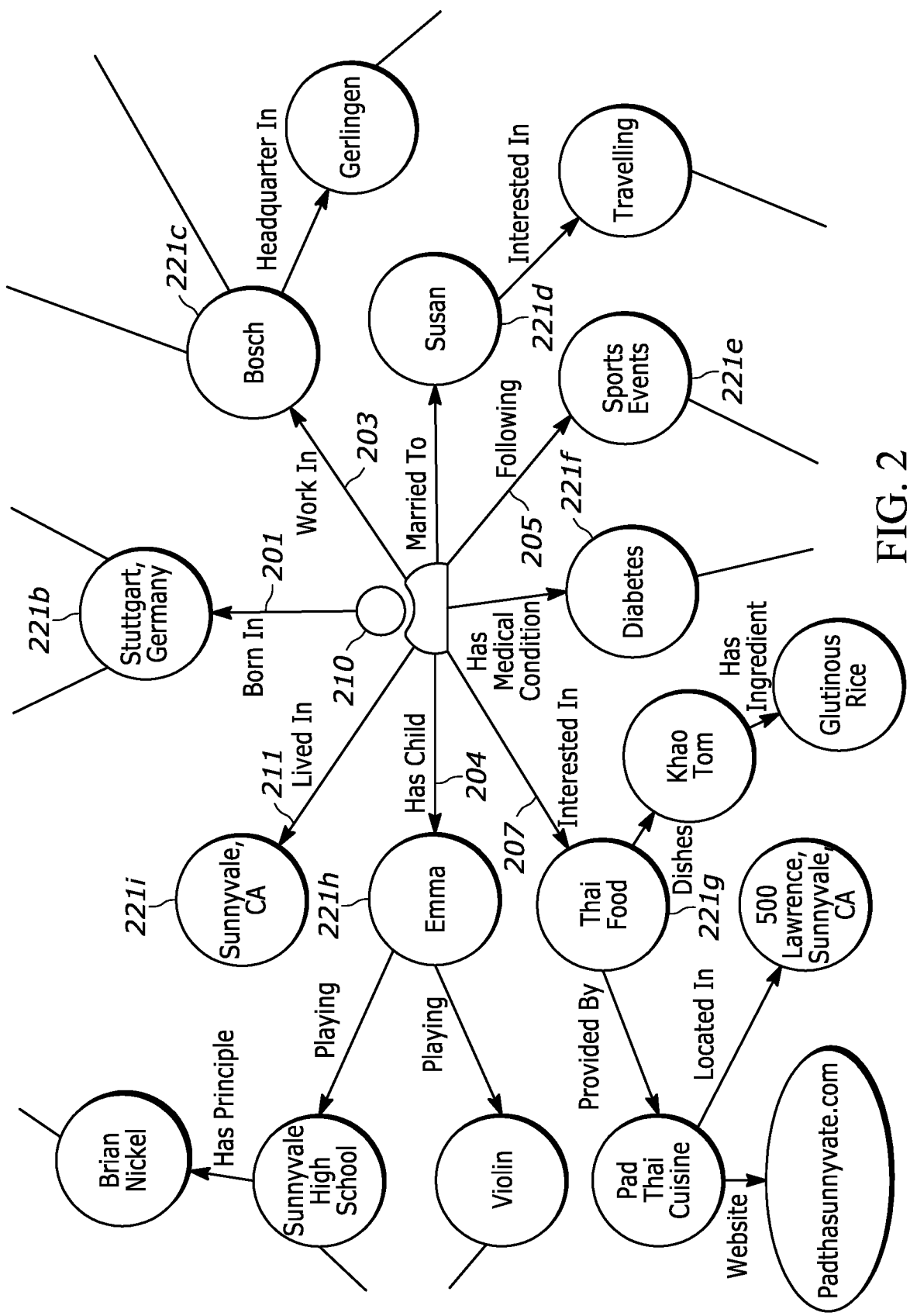
FIG. 2 discloses an example of a personal knowledge graph.

FIG. 2 discloses an example of a personal knowledge graph. The personal knowledge graph may related to a specific user 210. Upon gathering collection, the KG may determine various degrees of connections about the user to allow for customization. For example, a first degree connection may realize that the user's children 204, place of birth 201, place of employment 203, spouse, events it follows 205, and interests 207. Data from such types of connections may indicate the user was born in a specific location 221$b$ (e.g., Stuttgart, Germany), place of employment is Bosch 221$c$, name of the spouse 221$d$, sporting events the user follows 221, medical condition is diabetes 221$f$, the user is interested in Thai food 221$g$, children's name 221$h$, previous residence location 221$i$, etc.

Such information of FIG. 2 shows another example of the personal KGs, which is a graphical representation of the descriptions of the person, e.g., he was born in Germany and he now works at Sunnyvale, etc. To achieve this goal (i.e. construct comprehensive personal KGs), our model attempts to infer personal facts from the two main resources: social media information and transcribed conversation of users using the process shown in FIG. 3, below. As disclosed, the figures and specific may describe how these personal facts can be inferred from two main resources.

LSH hashes data points into buckets such that the points near each other locate into the same buckets. The intuition behind this approach can be employed here to find similar documents with the predefined threshold for addressing character mismatches between the retrieved entities and the identified entity text. LSH algorithm scales easily and can significantly speed up the nearest neighbor search process.

The system can measure similarity of text at the character level and measure circumvent the impact of misspelling for the identified entity text. The similarity may be assigned a weight that is utilized to measure the probability of a match.

Figure 3:
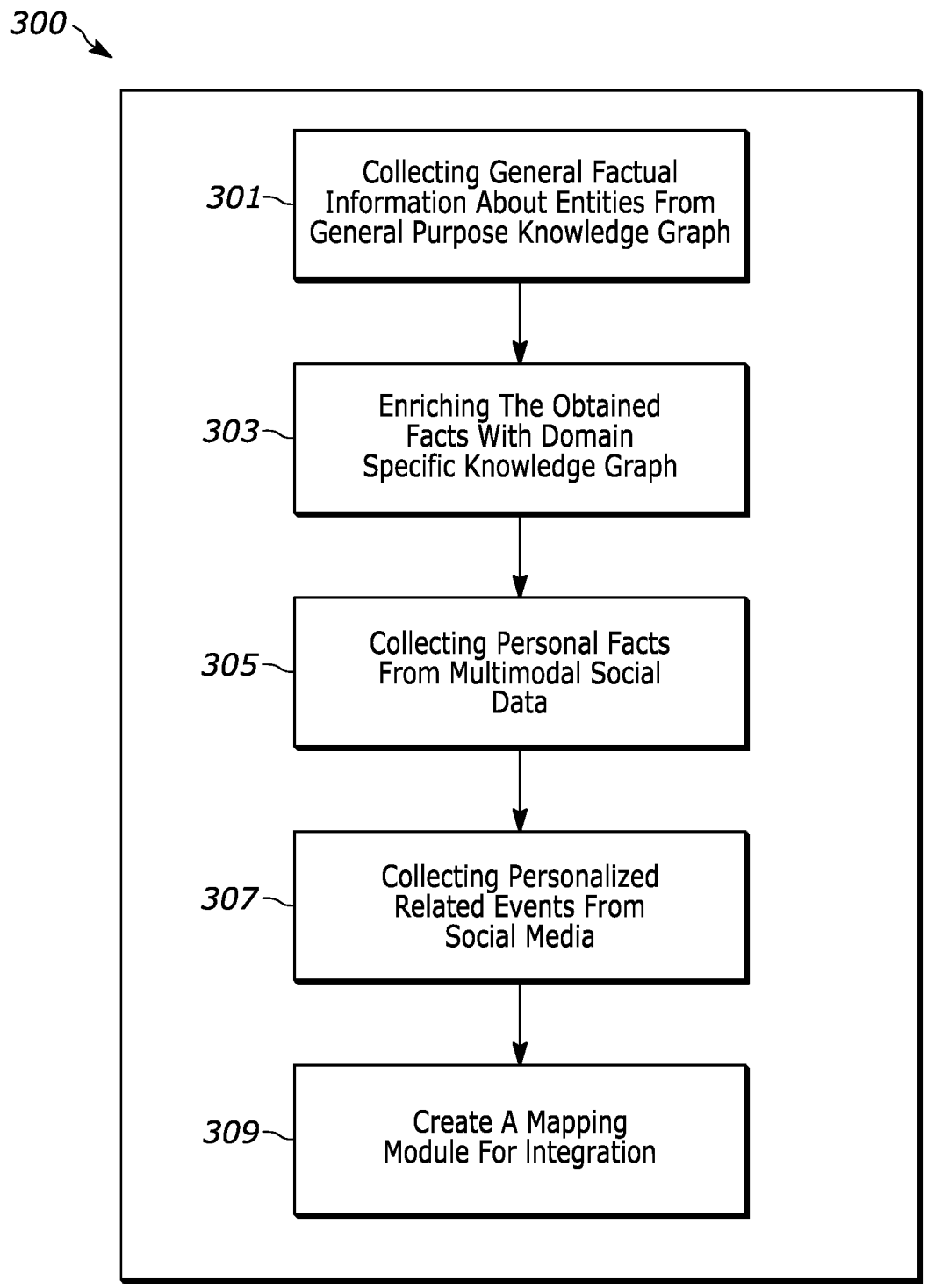
FIG. 3 discloses illustrates an example flow chart of creating a mapping module for integration.

Inferring personal facts from latent cues embedded in the dialogue texts will help intelligent assistants to provide more meaningful responses. Conversations are often considered a rich source of emotional signals and personal traits. Personal facts include any attributes related to the description of a specific person such as age, gender, ethnicity, political views, profession, interests, skills, relationships, geolocation information, and even personality. Extracting triples <person, attribute, value> for each user and insert them into a personal KG is our ultimate goal here. For instance, <Brad> <studied at> <university of Pittsburgh> and <Brad> <Lived In> <Philly> are samples of such triples that describe the person "Brad". FIG. 2 shows another example of the personal KGs, which is a graphical representation of the descriptions of the person, e.g., he was born in Germany and he now works at Sunnyvale, etc. To achieve this goal (i.e. construct comprehensive personal KGs), our model attempts to infer personal facts from the two main resources: social media information and transcribed conversation of users using the process shown in FIG. 3. We specifically describe how these personal facts can be inferred from two main resources below:

FIG. 3 illustrates an example flow chart of creating a mapping module for integration. At step 301, the system may collect general factual information about entities from the general purpose knowledge graph. Such information may be related to general information and not specific to the user, such as information about a city, sporting event, food, etc. For example, the general purpose knowledge graph may understand that Detroit is located in Michigan, in the Midwest, and has 4 major sports teams, Detroit Lions, Detroit Tigers, Detroit Pistons, and Detroit Red Wings. At step 303, the system may then be enriching the obtained facts with domain specific knowledge graph. This may include a users interests, for example, their sports. Thus, if a user is interested in basketball and from Detroit, they may want information related to the Detroit Pistons. At step 305, the system may collect personal facts from the multimodal social data. This may include relatives, places of residences, employment, etc. At step 307, the system may collect personalized related events from the social media. The system may have interaction with various social media accounts, posts, and networks that are relevant to the user. For example, the system may initialize accessing the timelines of the social media of users, extract the descriptions of the schedules and the appointments included in the posts listed in the timeline. At step 309, the system then may finally generate mappings among all the data collected from previous steps, which may lead to the construction of unified, comprehensive knowledge graphs that describes the profiles of specific users, such as the populated knowledge graph shown in FIG. 2.

Figure 4:
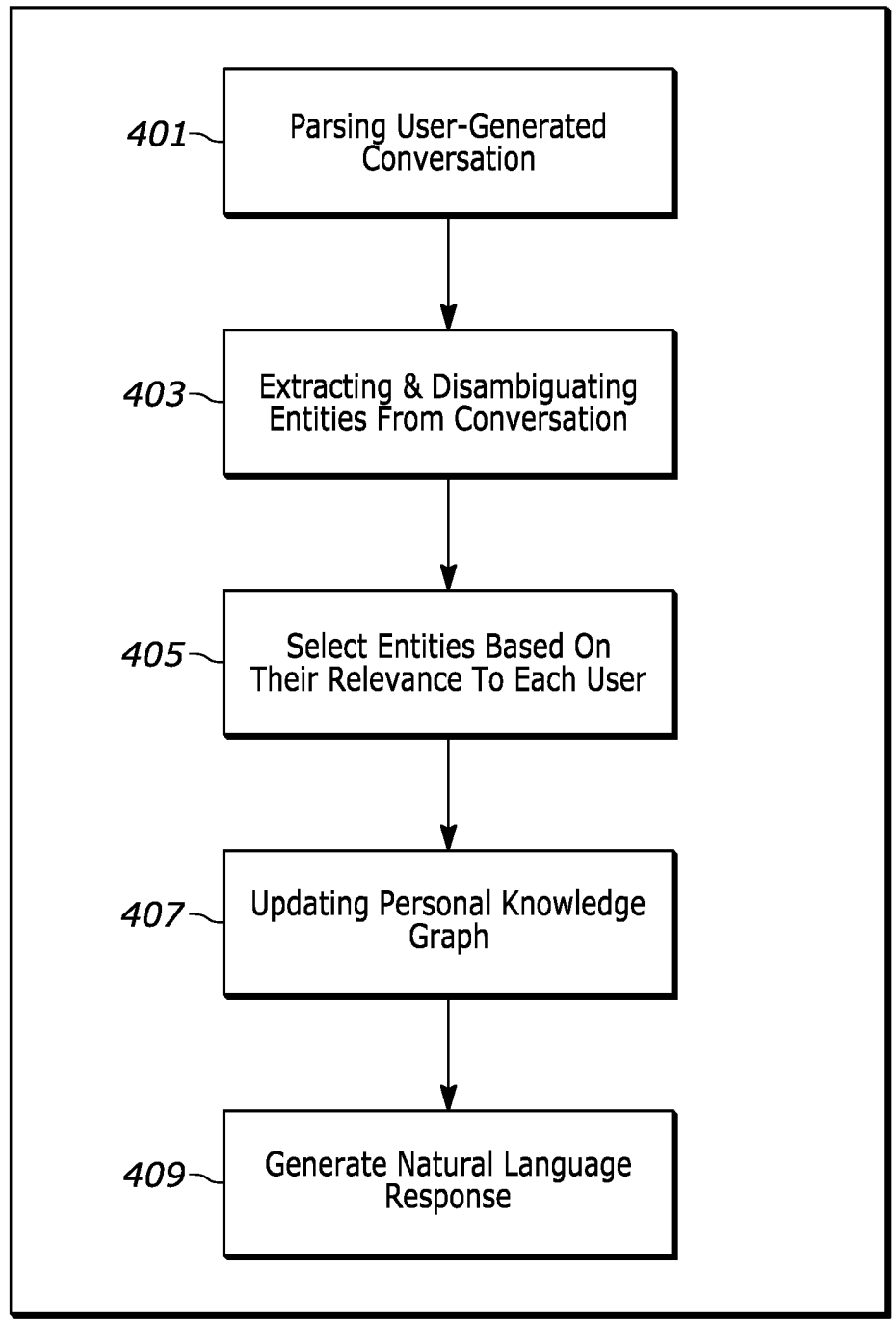
FIG. 4 discloses a flow chart of a conversational parsing based on the knowledge graph.

FIG. 4 illustrates a flow chart of a conversational parsing based on the knowledge graph. In such a scenario, the system may receive spoken dialogue commands or a text message response indicating a command or contextual information. At step 401, the system may parse the user-generated conversation into various elements. For example, the parsing may identify an action, a subject, a user who is speaking, and other information. At step 403, the system may extract and disambiguate the entities from the conversation. Thus, the system may determine the various entities from the conversation. For example, factual human knowledge may often represent as a KG consisting of entities (e.g. objects or abstract concepts), relationships among entities, and descriptions of entities (e.g. types and properties). At step 405, the entities may be selected based on their relevance between each user profile, thus a relevant entity for one user may not be relevant to another user. At step 407, the system may update the personal knowledge graph, such as the one shown in FIG. 2. Thus, a knowledge graph may be updated based on the relevant entities extracted from the conversation and updated by the user. Thus, if it is determined a user is inquiring about basketball often, the KG may be updated to reflect on the interest of basketball. At step 409, the system may generate a natural language response to the conversation. Thus, an output and response may occur to the various conversation that may activate various actions related to the conversation.

Figure 5:
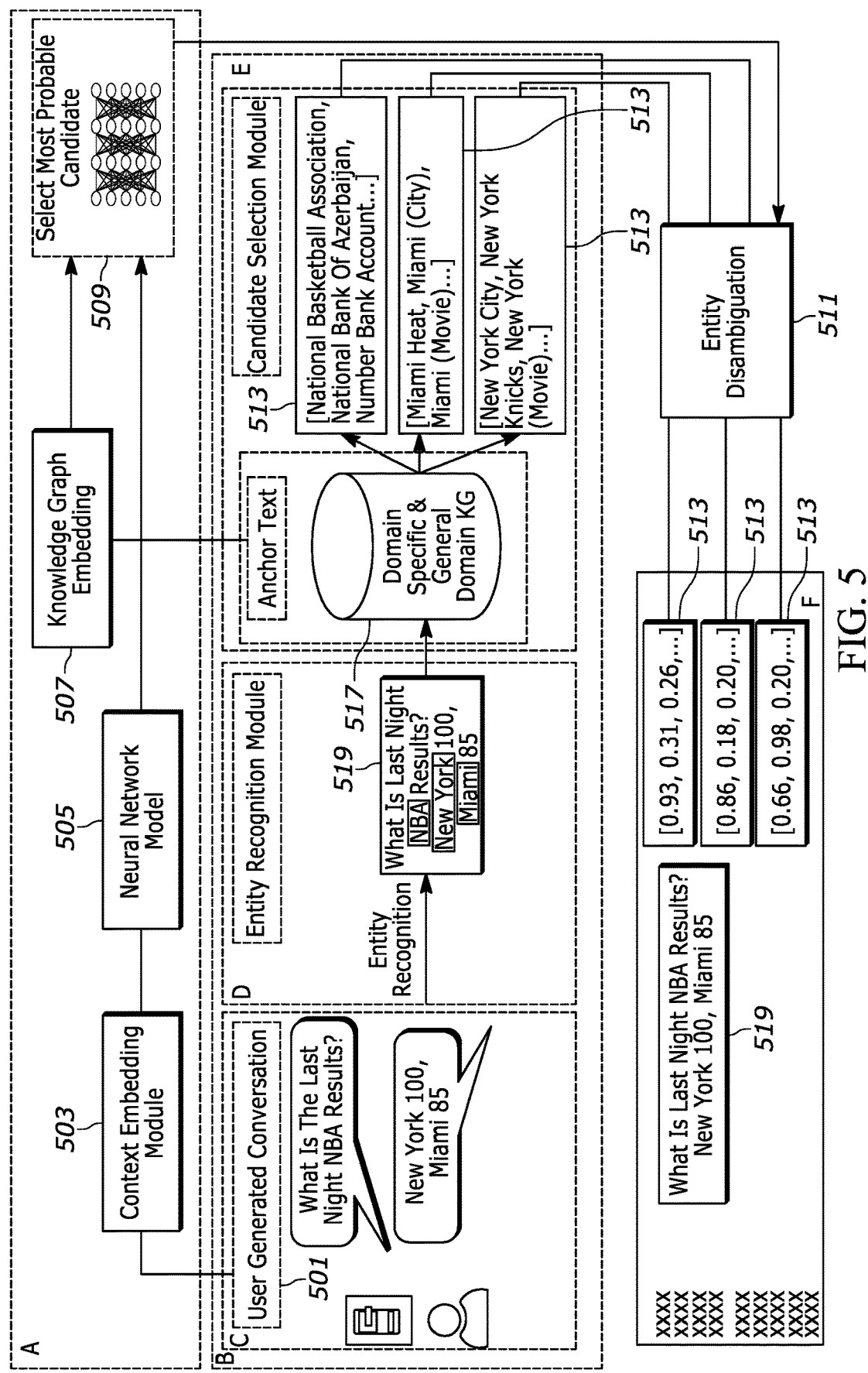
FIG. 5 discloses one example of an embodiment of a flow utilizing entity extraction/disambiguation from a conversation.

FIG. 5 is one example of an embodiment of a flow utilizing entity extraction/disambiguation from a conversation. One of the main steps towards understanding textual content is Named Entity Disambiguation (NED) and Named Entity Linking. A powerful model may need to leverage both the contextual information (e.g., element B of FIG. 5) as well as the graphical information (e.g. the context embedding module 503, the neural network model 505, the knowledge graph embedding 507, and the selection of the most probable candidate 509) for performing the disambiguation task (e.g., of the user generated conversation 501). Specifically, given the generated textual content in the conversation (e.g., of the user generated conversation 501), the model first needs to identify all the words of interest while assigning a unique identifier to them (e.g., the entity recognition module 519). Then, perform the candidate selection (words often refer to multiple entities) while narrowing down the possible candidates and selecting right candidates (see e.g., the candidate selection module 513).

First, the model may capture all named entities from the conversation while mapping them into Wikipedia articles, as shown in the entity recognition module 519. Wikipedia articles or other data found in the entity recognition module 519 may often contain hyperlinked text (i.e., anchor text) that link them to each other as shown in the candidate selection module 513. Thus, in the Wikipedia's article that describes "Miami (city)", several anchor texts can exist describing relevant entities such as "Miami (city)", "Miami Heat", "Miami (movie)", etc. The model therefore can provide information about the frequency that anchor texts corresponds to the target page. For each identified entity, the model then obtains the top-k anchor entities. The intuition behind this approach is when anchor text maps to an entity with a high frequency on Wikipedia, the chance that the anchor text will refer to that entity without the Wikipedia context is very high. However, it should be noted that anchor text alone cannot capture all the entitles as even one-character misspelling would result in no matching. This highlights the need for having a similarity matching module; this module can use existing algorithms and techniques such as Jaccard similarity and MinHash LSH. The entity disambiguation model 511 may help parse the various information identified in the context of the conversation.

For entity linking, the system may consider using several available techniques, such as text-based approaches that utilizes textual features extracted from text corpora or graph-based approaches that utilizes KGs to express the context and the relation of entities. In this work, we used hybrid approaches by employing classifiers and embeddings to decide whether each candidate is the right entity for the word of interest or not. For example, this model can use neural networks to create a mapping between the embeddings representing target knowledge graphs and the embeddings representing local contexts of words representing entities, which is the process shown in FIG. 5-A. We can then predict the candidate with the max probability as the correct entity.

The output 519 shows the result of this predictions for the entity NBA where its probability is 0.93; similarly, the probability of New York and Miami are represented as 0.86 and 0.98. Thus, for each conversation, a probability for each selection candidate 513 is identified and the highest probability is output. If multiple selection candidates 513 are identified that are similar in a top score, the system may output multiple candidates for selection.

Figure 6:
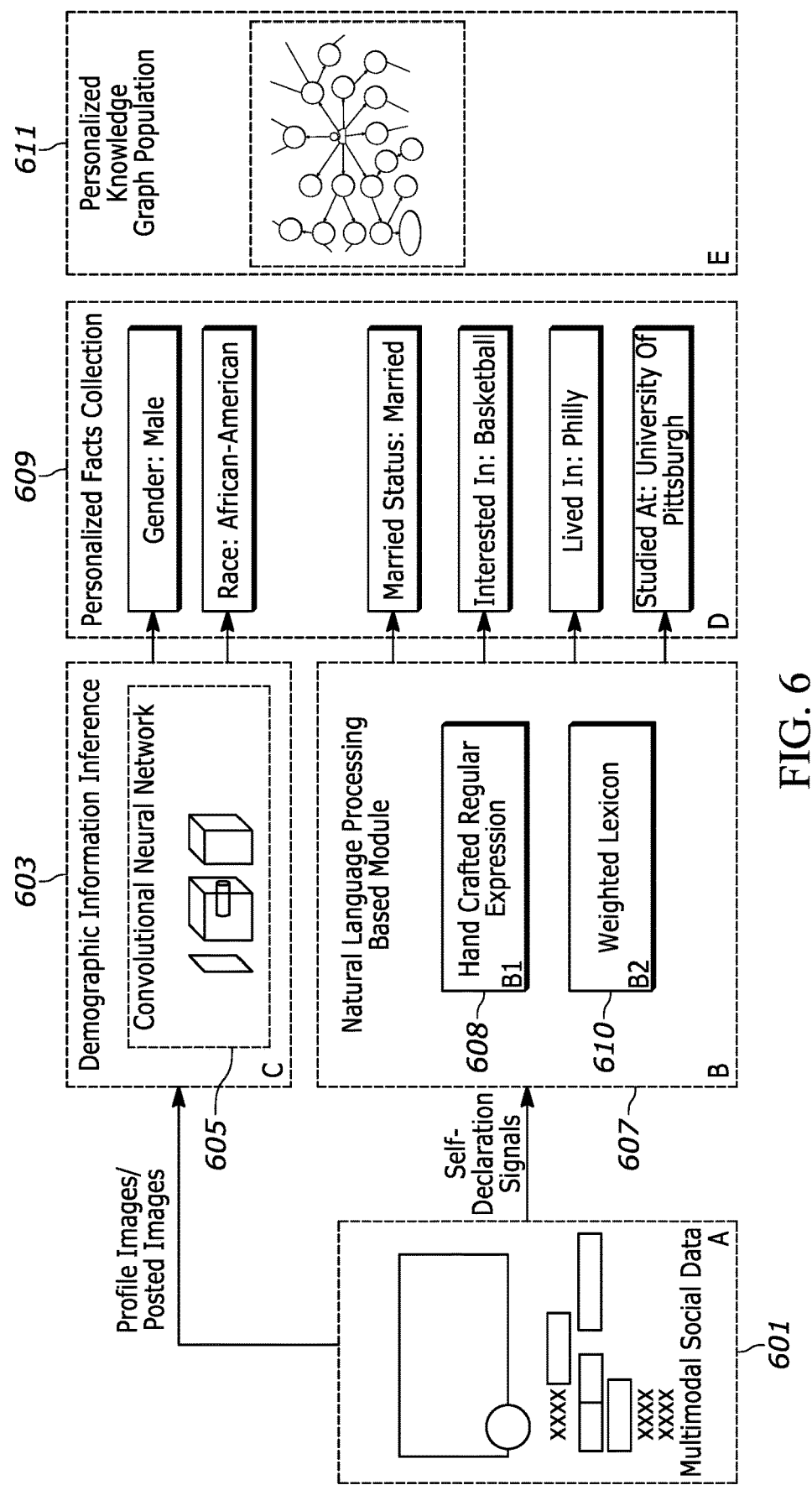
FIG. 6 discloses an embodiment that utilizes social media data with an embodiment of the system.

FIG. 6 illustrates an embodiment that utilizes social media data with an embodiment of the system. With the ubiquity of social media platforms, millions of people are now sharing their online persona by expressing their hobbies, thoughts, emotions, facial identity, geographical information, and even their demographics (e.g. age, gender) as shown in FIG. 6 via social media data 601. In this work, the system may employ multimodal social data to infer users' personal information from their social media content. The profile images and posted images gathered from the social media data 601 may be sent to the demographic information inference module 603. The demographic information inference module may utilize a machine learning network 605, such as a convolutional neural network, to utilize machine learning to improve changing aspects of the user profile. For inferring demographic information, the system may obtain heterogeneous sets of features while processing visual and textual content of users shared on social media. The system may employ self-declaration signals while applying natural language processing techniques e.g. regular expression for extracting information such as gender, age, and race. Self-declaration refers to providing small biography in profile description that contains information related to user demographic (age, gender, marital status, etc.), which may be collected via the personalized facts collection module 609. The personalize facts collection module or database may include other information, such as age, various schools, occupation, hobbies, favorite teams, favorite sports, etc. For instance, the system can apply regular expression patterns to extract age information from the profile descriptions (such as "17 years old" or "Born in XXXX(1988)") (e.g., via the hand crafted regular expression module 608). Furthermore, for those who did not provide their age information in their profile description, the system may provide an estimation by using a weighted lexicon of terms such as the ones built from 75,394 Facebook users who shared their demographics (e.g., via the weighted lexicon module 610). Besides, for those who reveal their facial identity, the system can process the visual content of posted images/profile images with neural networks such as convolutional neural networks and obtain approximated age, gender, and race information via the machine learning network 605. The system may create a personalized knowledge graph population 611 utilizing such information collected on the social media data. As discussed in the other sections, the personalized knowledge graph may be utilized for the NLU engine.

Figure 7:
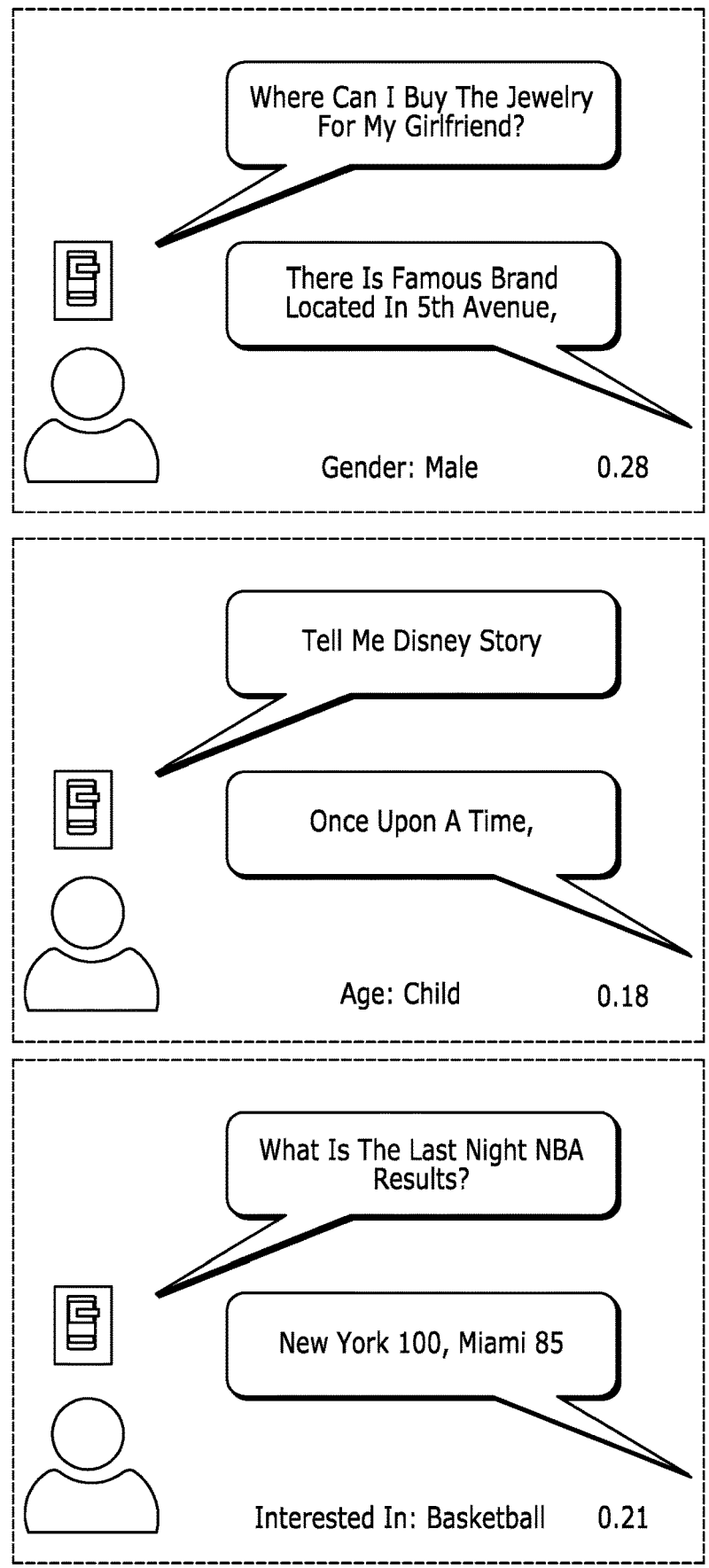
FIG. 7 discloses several illustrations of examples of the types of information collected from the contextual conversation.

FIG. 7 illustrates several illustrations of examples of the types of information collected from the contextual conversation. For example, the model may have a focus on inferring that a user who often talks about jewelry, girlfriend, would be a male and single (with probability of 0.28), while a subject who often used terms such as Disney story, daddy, and homework could be a child (with probability 0.18). In another example, the user may determine what the results were for a basketball game, with the result having a 0.21 probability. The system may determine that the user has some interest in basketball in response to the user asking questions about a score for came. Additionally, the system may determine which teams the user is interested in by repetitive asking of the score for that team. The system may use the above schema with different configurations to obtain the ideal model. For example, the system can begin by building two groups as follows, a baseline group and a attention group. In the baseline group, the system may simply integrate the embeddings by calculating the average of terms in each dialogue of the subject. The system may then utilize Softmax activation functions to predict the probability distribution over the values of the objects, according to one embodiment. The system may also apply attention mechanisms to teach the model to learn which terms and dialogues to focus on for the given predicate.

Figure 8:
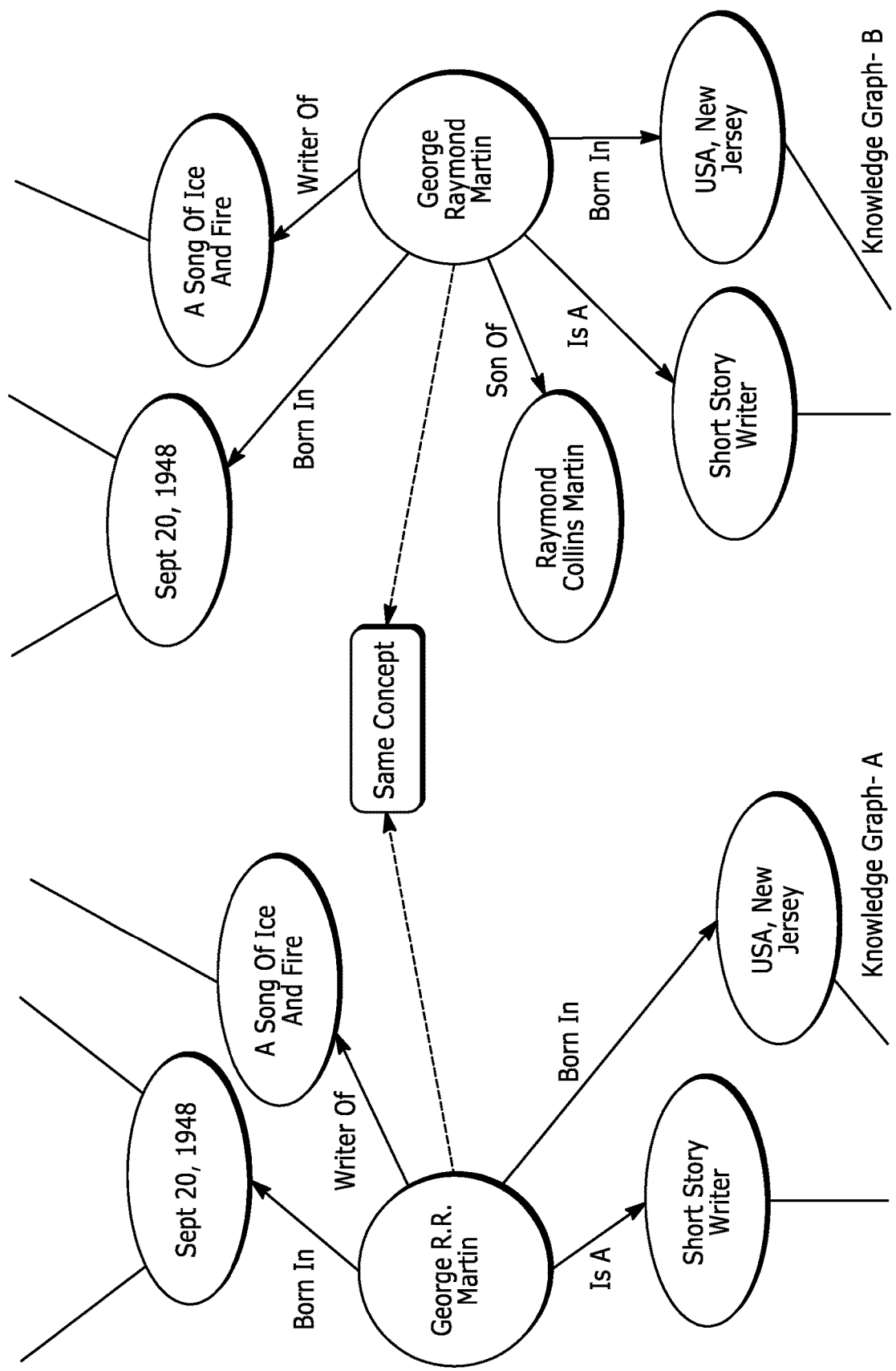
FIG. 8 discloses an embodiment of utilizing cross-attention mechanism between these two groups.

FIG. 8 illustrates an embodiment of utilizing cross-attention mechanism between these two groups. Incorporating structured human knowledge and represent it to intelligent systems to obtain the ability of solving complex tasks may be a paradigm in artificial intelligence (AI). Factual human knowledge is often represented as a KG consisting of entities (e.g. objects or abstract concepts), relationships among entities, and descriptions of entities (e.g. types and properties). The illustration of FIG. 8 shows two different KGs (KG-A and KG-B) describing "George R. R. Martin" and related entities such as his birthplace and birthday using the property "Born in". Many real-world knowledge-aware products including recommendation systems, natural language understanding, and question answering benefits from the integration of heterogeneous information and the semantics among them. However, modeling the whole world through the abstract representation of entities and their relations would be very challenging and often leads to the inherent problem of incompleteness in knowledge graphs. This motivates several subtasks for adding new triples to knowledge graphs namely relations prediction, entity prediction, link prediction, and knowledge graph integration. Knowledge graphs can complement each other when they integrate properly. FIG. 8 shows that entities across different KGs that refer to the same concepts may need to be mapped together, e.g., "George R. R. Martin" and "George Raynold Martin". Another utterance would be entities "Barack Obama", "Barack H Obama", "44th President of the United States", and "Senator Obama" are all needs to be referred a same person.

To address such a challenge, the system may include developed general models that can generate a structure-aware representation for each entity while mapping entities into their representation. Many different types of representations can be considered for the models including vectors and graphs. As an example, FIG. 9 below shows the two groups (left and right) of the concatenations of the fixed-length vectors generated from embeddings, e.g., the left group of the vectors expresses the descriptions of the George R. R. Martin shown in KG-A of FIG. 8, such as "Song of Ice and Fire", "New Jersey", the person's name itself. Similarly, the right group represents the vectors corresponding to the KG-B in FIG. 8. In addition, additional techniques can be used to further enhance the model's outcome while focusing on similar neighborhoods and giving them higher weights such as attention mechanism. For examples, cross-attention mechanism can be used between these two groups (left and right) vectors as shown in FIG. 8. As an another example, it is also beneficial to employ self-attention mechanism during training to impede the overweighting of similar nodes, which helps in learning discriminative attributes of entities with many common attributes as shown in FIG. 10. This ensures the correspondence among the graphs and leads to generate a similar representation for the nodes.

Figures 9A, 9B:
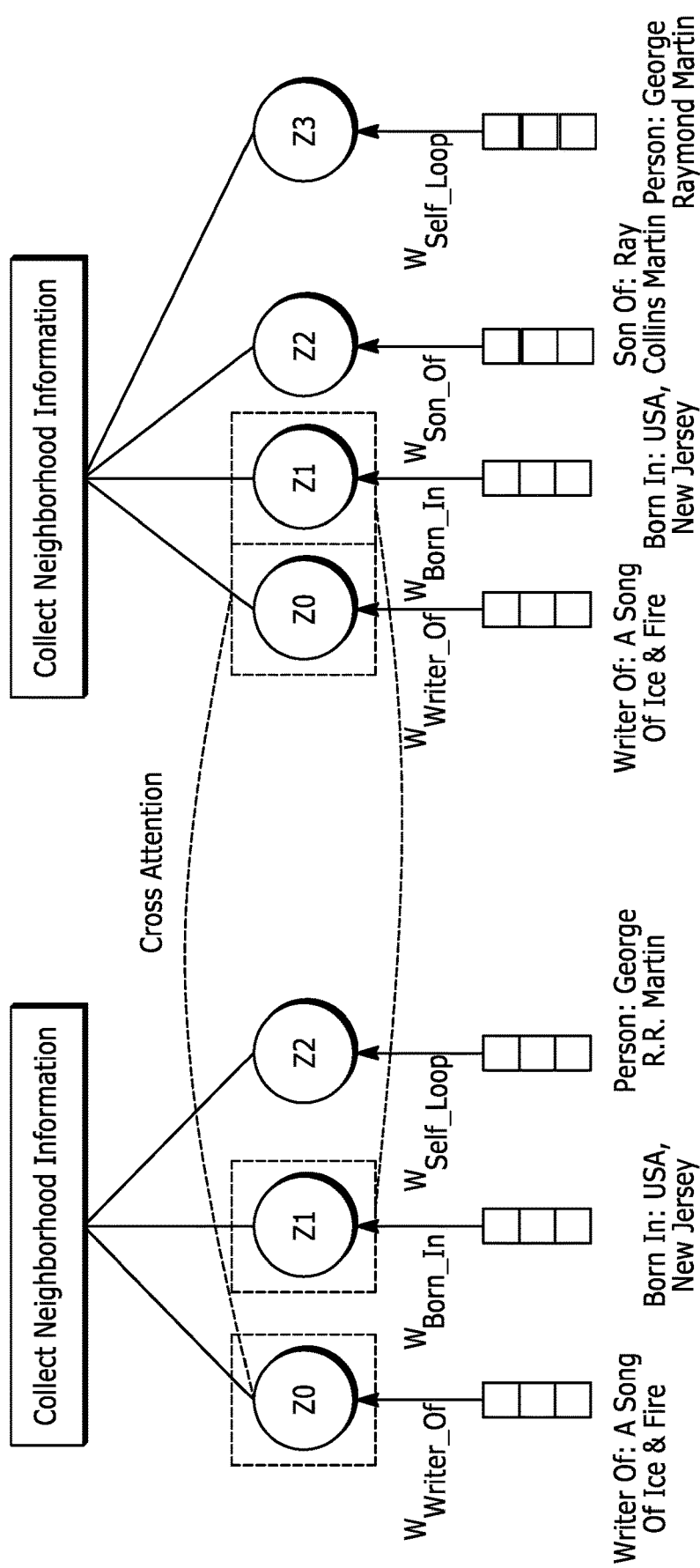
FIG. 9A discloses an illustration of a first group of concatenations of fixed-length vectors.
FIG. 9B discloses an illustration of a related second group of concatenations of fixed-length vectors.
Figure 10:
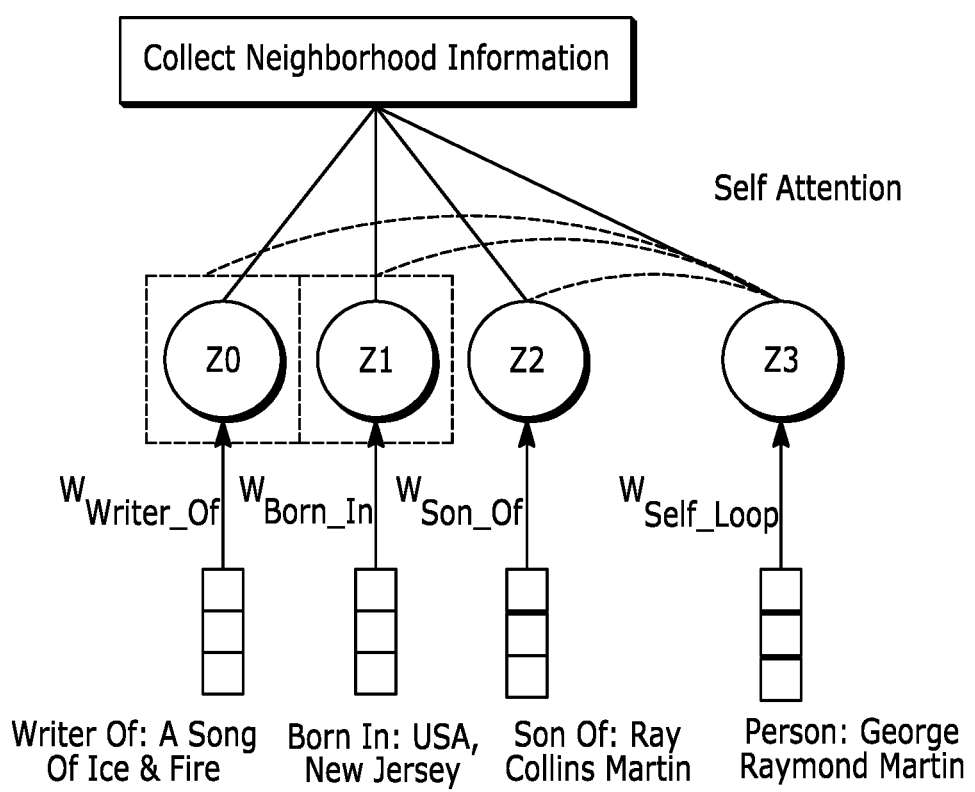
FIG. 10 discloses an example of a system learning discriminative attributes of entities with common attributes.

FIG. 9A is an illustration of a first group of concatenations of fixed-length vectors. FIG. 9B is an illustration of a related second group of concatenations of fixed-length vectors. As an example, FIGS. 9A and 9B shows an example of two groups (left and right) of the concatenations of the fixed-length vectors generated from embeddings, e.g., the left group of the vectors in FIG. 9A expresses the descriptions of the George R. R. Martin shown in KG-A of FIG. 8, such as "Song of Ice and Fire", "New Jersey", the person's name itself. Similarly, the right group of FIG. 9A represents the vectors corresponding to the KG-B in FIG. 8. In addition, additional techniques can be used to further enhance the model's outcome while focusing on similar neighborhoods and giving them higher weights such as attention mechanism.

FIG. 10 discloses an example of a system learning discriminative attributes of entities with common attributes. In such an example, it is also beneficial to employ self-attention mechanism during training to impede the overweighting of similar nodes, which helps in learning discriminative attributes of entities with many common attributes as shown in FIG. 10. This ensures the correspondence among the graphs and leads to generate a similar representation for the nodes. In such an example, for collecting neighborhood information, the system may determine from a person "George Raymond Martin" that they were born in New Jersey, the son of Ray Collins Martin, and the writer of "A Song of Ice & Fire."

There are many similarities between the short and colloquial content of social media posts and spoken utterances. The flow of natural language conversations is also similar to the threads in topical forums. However, social data often contain additional signals such as user activity, visual content, and profile description alongside the textual content. Hence, extracting useful information out of noisy conversational data is very challenging as explicit assertions such as "I am an engineer" are rare in real-life conversations, i.e. personal traits are often implicitly expressed in conversations. To effectively extract implicit personal information, we developed a neural network model that can assign the ranks of the entities describing personal preferences or traits.

The system may utilize a model that can be implemented using any types of neural networks with hidden layers, encoders, and decoders. Given a sequence of terms used in dialogues, the system can first create a representation of the sequence while weighting each term according to their importance; we then create a representation of the subject based on all their dialogues while weighing their importance. Such terms, weights, and importance can be (1) manually curated for the purpose of trainings or (2) semi-automatically collected and refined, e.g., surveying from potential users. Using the terms, weights, and importance, we then train the networks so that, given the subject representation, the network can output the probability distribution over the object value.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method executed by a controller for speech recognition in a system comprising:
    parsing a plurality of candidate speech recognition results from a speech input from a user, wherein the parsing is conducted utilizing information associated with a personal knowledge graph corresponding to a user profile of the user and a separate domain-specific knowledge graph that includes a curated collection of background information;
    extracting and disambiguating one or more entities from the plurality of candidate speech recognition results, based on natural language understanding (NLU) information utilizing both the personal knowledge graph and the separate domain-specific knowledge graph, wherein the separate domain-specific knowledge graph includes a baseline group and an attention group, wherein the separate domain-specific knowledge graph further includes an attention mechanism configured to, during training, impede overweighting of similar nodes in the baseline group and the attention group, wherein the baseline group integrate embeddings by calculating an average of terms in each dialogue of a subject, wherein disambiguating one or more entities includes linking the one or more entities via utilizing both classifiers and embeddings with a neural network;
    selecting and retrieving data indicative of information of the one or more entities from a remote server as one or more relevant entities;
    in response to the one or more relevant entities extracted and disambiguated from the speech input, updating the personal knowledge graph associated with the user profile of the user utilizing the data indicative of information of the one or more relevant entities; and outputting a response to the speech input utilizing the user profile and the NLU information.

2. The method of claim 1, wherein the method includes collecting data indicative of the one or more entities utilizing a general-purpose knowledge graph.

3. The method of claim 1, wherein the method includes utilizing the neural network to extracting the one or more entities.

4. The method of claim 3, wherein the neural network is a convolutional neural network.

5. The method of claim 1, wherein the selecting and retrieving data indicative of information of the one or more entities from the remote server includes assigning a probability associated with one or more candidates associated with the one or more entities.

6. The method of claim 1, wherein the remote server includes one or more servers including data indicative of social media information associated with the user.

7. The method of claim 6, wherein the personal knowledge graph is updated utilizing the data indicative of social media information retrieved from a social media website and is associated with the user.

8. The method of claim 1, wherein the remote server includes one or more general knowledge graphs.

9. A speech recognition system, comprising:
a microphone configured to receive a speech input from one or more users;
a processor in communication with the microphone, the processor programmed to:
parse a plurality of candidate speech recognition results from a speech input from a user, wherein the parsing is conducted utilizing information associated with a personal knowledge graph corresponding to a user profile of the user and a separate domain-specific knowledge graph that includes a curated collection of background information, wherein the separate domain-specific knowledge graph includes a baseline group and an attention group, wherein the separate domain-specific knowledge graph further includes an attention mechanism configured to, during training, impede overweighting of similar nodes in the baseline group and the attention group, wherein the baseline group is defined by calculating an average of terms in each dialogue of a subject, wherein disambiguating one or more entities includes linking the one or more entities via utilizing both classifiers and embeddings with a neural network;
extract one or more entities from the plurality of candidate speech recognition results, based on natural language understanding (NLU) information;
select and retrieve data indicative of information of the one or more entities from a remote server;
update the personal knowledge graph associated with a user profile of the user utilizing the data indicative of information of the one or more entities; and
output a response to the speech input utilizing the user profile.

10. The speech recognition system of claim 9, wherein the remote server includes a general knowledge graph and the processor is further programmed to update the personal knowledge graph utilizing data indicative of information of the one or more entities from the general knowledge graph.

11. The speech recognition system of claim 9, wherein the remote server includes social media data and the processor is further programmed to update the personal knowledge graph utilizing data indicative of information of the one or more entities from the social media data.

12. The speech recognition system of claim 9, wherein the processor is further programmed to output a response to the speech input utilizing the NLU information.

13. A method executed by a controller for speech recognition in a system comprising:
parsing a plurality of candidate speech recognition results from a speech input from a user, wherein the parsing is conducted utilizing information associated with a personal knowledge graph corresponding to a user profile of the user and a separate domain-specific knowledge graph that includes a curated collection of background information, wherein the separate domain-specific knowledge graph includes a baseline group and an attention group, wherein the separate domain-specific knowledge graph further includes an attention mechanism configured to train to impede overweighting of similar nodes in the baseline group and the attention group, wherein the baseline group integrate embeddings by calculating an average of terms in each dialogue of a subject, wherein disambiguating one or more entities includes linking the one or more entities via utilizing both classifiers and embeddings with a neural network;
receiving a first plurality of feature vectors from each of the plurality of candidate speech recognition results from a speech recognition engine, the first plurality of feature vectors includes a first confidence score;
receiving a second plurality of feature vectors from each of the plurality of candidate speech recognition results from the speech recognition engine, the second plurality of feature vectors includes a second confidence score that is lower than the first confidence score;
extracting, based on natural language understanding (NLU) information, a NLU result from each of the plurality of candidate speech recognition results;
associating, via a ranker, a ranking score to each of the plurality of candidate speech recognition results, the ranking score being based on the plurality of feature vectors and the NLU result of each of the plurality of candidate speech recognition results, wherein ranker promotes the second confidence score to be greater than the first confidence score based on the NLU related features;
selecting the user profile associated with the user, wherein the user profile includes the personalized knowledge graph;
in response to the one or more relevant entities extracted from the speech input, updating and outputting the user profile utilizing the plurality of candidate speech recognition results and the personalized knowledge graph; and
outputting a response to the speech input utilizing at least the user profile.

14. The method of claim 13, wherein the method includes obtaining social network data associated with the user; and
updating the user profile utilizing the social network data associated with the user.

15. The method of claim 13, wherein the method includes obtaining domain-specific knowledge graph data associated with the user; and
updating the user profile utilizing the domain-specific knowledge graph data associated with the user.

16. The method of claim 13, wherein the method includes obtaining general-purpose knowledge graph data associated with the user; and
updating the user profile utilizing the general-purpose knowledge graph data associated with the user.

17. The method of claim 13, wherein the method includes communicating with a remote server that includes social media data, and updating the personal knowledge graph utilizing data indicative of information of one or more entities from the social media data.

18. The method of claim 13, wherein the plurality of candidate speech recognition results includes data indicative of one or more entities.

19. The method of claim 13, wherein the method includes outputting the response to the speech input utilizing the NLU information.

20. The method of claim 19, wherein the method includes outputting the response to the speech input utilizing personalized knowledge graph.

* * * * *